Aug. 20, 1968  R. J. FRITZ  3,397,730
LIQUID FEED DISTRIBUTOR
Filed Dec. 21, 1965

INVENTOR:
ROBERT J. FRITZ
BY
ATTORNEY

United States Patent Office 3,397,730
Patented Aug. 20, 1968

3,397,730
LIQUID FEED DISTRIBUTOR
Robert J. Fritz, Burlington, Vt., assignor to General
Electric Company, a corporation of New York
Filed Dec. 21, 1965, Ser. No. 515,338
5 Claims. (Cl. 159—13)

The present invention relates to liquid treating apparatus in which the liquid is treated as it flows in a thin film over a surface of the apparatus. More particularly, this invention relates to a device for continuously providing a smooth, even-flowing film of liquid on a surface from which evaporation of the liquid occurs.

Falling film heat-exchangers, evaporators, and gas contactors, in which a liquid to be treated is allowed to flow in a thin film over a treating surface, are well known in the art. Maximum utilization of the treating surface requires a smooth, even flow of liquid film over the entire surface but this is generally unobtainable with the liquid feed distributors that have been used in such apparatus in the past. The common types of prior art liquid feed distributors for this type of apparatus comprise either a spray nozzle for delivering the liquid in a distributed form over the treating surface or a liquid overflow by which the treating surface is continuously flooded from the opposite side of the treating surface. In the latter type of liquid feed distributor, the velocity at the top of the treating surface is almost zero and the treatment of the liquid at that point is therefore less effective than at points lower on the treating surface where the velocity of the liquid is increased, since mass and heat transfer coefficients generally increase with increase in velocity. Where spray nozzle distriubtors are used, problems arise from uneven liquid distribution and entrainment of liquid mist in the vapor space of the apparatus.

One object of the present invention is to provide a means for producing a smooth, even-flowing film of liquid on a surface of a falling film liquid treating apparatus, such as an evaporator.

A further object of this invention is to provide a liquid distributor which will disperse a thin, even-flowing film of liquid onto a vertical evaporating surface having depressions therein.

Briefly, the present invention is directed to a liquid feeding device which distributes a thin, even-flowing film of liquid on a liquid treating surface, which has linear depressions therein in the direction of flow of the liquid. This distributor comprises a liquid reservoir mounted adjacent or atop the treating surface, with an outlet, or a plurality of outlets, defined by the treating surface and by a retaining wall of the reservoir, which terminates near the treating surface. The outlet, or outlets, thus defined has a configuration corresponding to the terminus of the retaining wall opposed by the cross-sectional shape of the treating surface. In some cases, it may be desirable for the treating surface to abut the adjacent liquid-retaining wall so that the reservoir outlet configuration is actually defined by the depressions in the liquid-treating surface and the adjacent edge of the retaining wall of the reservoir.

While the specification concludes with claims particularly pointing out and distinctly claiming the subject matter of the present invention, it is believed that the invention will be better understood from the following description taken in conjunction with the accompanying drawings in which:

Figure 1:
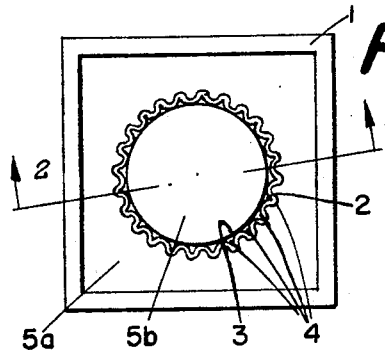
FIGURE 1 illustrates one embodiment of the present invention.

Referring more specifically to FIGURE 1, there is shown, in top view, a liquid feed distributor comprised of a liquid reservoir formed by side walls 1 and a bottom wall, made up of separate portions 5a and 5b for distributing liquid on a fluted, tubular surface, i.e., a tubular surface 3 having a plurality of depressions 4 therein. The bottom retaining wall portion 5a conforms with and mates to the fluted, tubular surface 3 while the other portion of the bottom retaining wall 5b terminates near the treating surface 3 and does not conform to the depressions 4 therein. The space between the non-conforming termination of the bottom retaining wall portion 5b and the fluted, tubular surface 3, which is mated with the conforming bottom wall portion 5a, forms an outlet 2 through which liquid may flow from the reservoir by gravity in a thin film-like stream onto the treating surface 3 and the depressions therein 4.

Figure 2:
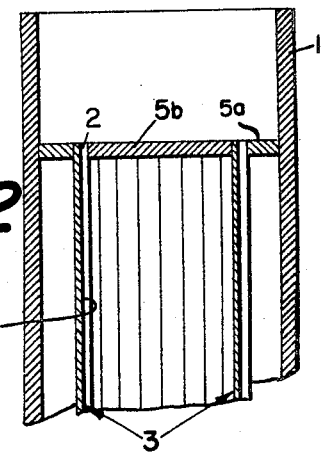
FIGURE 2 is a sectional view of the embodiment taken along line 2 of FIGURE 1.

The operation of the liquid distributor shown in FIGURE 1 may be better understood by reference to FIGURE 2, which is a sectional view of the apparatus shown in FIGURE 1, taken along line 2 thereof. Liquid in the reservoir passes through the outlet 2 and flows as a film down the surface 3 and the depressions therein 4. The pressure at which the film is formed on the treating surface and the resultant velocity of the falling film may be controlled either by the level of liquid in the reservoir or by the application of a static pressure head above the liquid in the reservoir. As the falling film passes over the treating surface it will be evaporated, by being heated, or be treated in some other way in a known manner.

The fluted, tubular treating surface illustrated in FIGURES 1 and 2 may also be combined with a plurality of like treating surfaces in a common reservoir.

Figure 3:
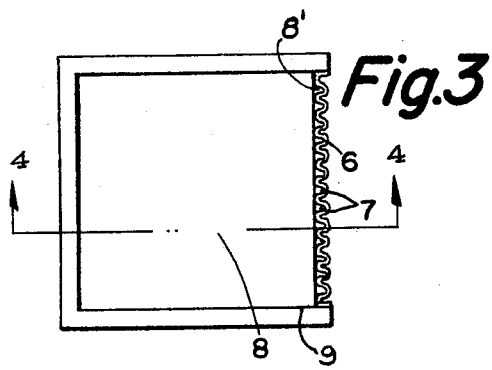
FIGURE 3 illustrates another embodiment of the invention.

In FIGURE 3 is shown, in top view, another embodiment of the liquid feed distributor of the present invention. In this embodiment, an essentially flat treating surface 6 having depressions therein 7 is used, as contrasted to the tubular surface in the embodiment illustrated in FIGURES 1 and 2. In this embodiment, the treating surface may form one wall in the structure of the apparatus. The remaining portions of the liquid feed distributor comprise the reservoir 8 and the reservoir retaining wall 9 which terminates near the treating surface. A sectional view of the liquid feed distributor, taken along line 4 of FIGURE 3, may be seen in FIGURE 4 and operation of the liquid feed distributor will be described with reference thereto. A liquid volume contained in the reservoir space 8 drains through the outlet space 8' formed by the treating surface and the retaining wall 9 as a smooth, even-flowing liquid film on the treating surface. As discussed with regard to the embodiment of the present invention illustrated in FIGURES 1 and 2, the pressure and velocity of the liquid film passing through the outlet formed by the treating surface and the retaining wall 9 may be controlled by regulating either the depth of liquid in the reservoir or by the application of a static head above the liquid contained therein.

Figure 4:
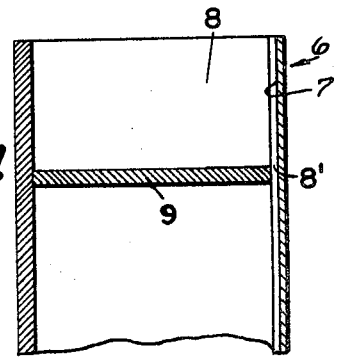
FIGURE 4 is a sectional view of the embodiment taken along line 4 of FIGURE 3.
Figure 5:
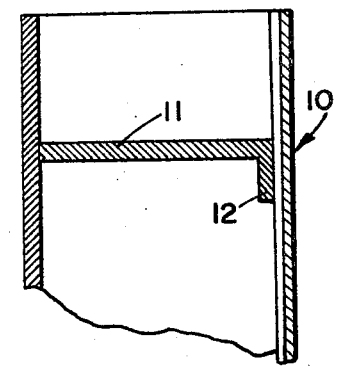
FIGURE 5 illustrates a further modification of the present invention.

In a further modification of the present invention, as shown in FIGURE 5, a liquid treating surface 10, similar to that shown in the previous FIGURES 3 and 4, is used in conjunction with a liquid retaining wall 11 which differs from that shown in FIGURES 3 and 4 by the addition of a skirt or extension 12 which parallels the treating surface 10 and further improves the distributions of the liquid film on the treating surface 10.

Figure 6:
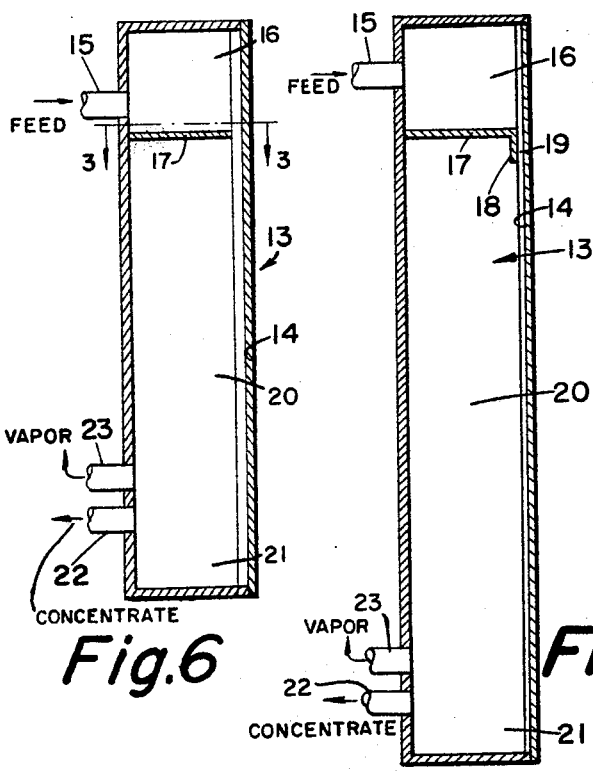
FIGURE 6 illustrates an internal view of an apparatus incorporating an embodiment of the present invention.
Figure 7:
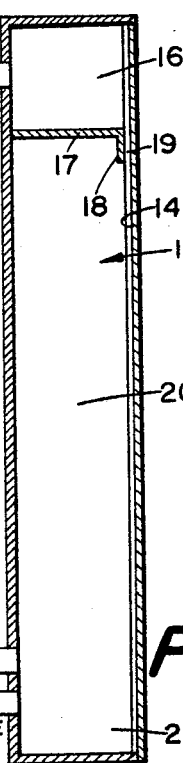
FIGURE 7 is an internal view of an apparatus in which is incorporated the embodiment of FIGURE 5.

In FIGURE 6 there is shown schematically a side, internal view of a falling film liquid evaporator incorporating this invention and FIGURE 7 shows a similar view of an evaporator in which is incorporated the embodiment of the invention shown in FIGURE 5. FIGURES 6 and 7 thus disclose a falling film liquid evaporator 13 including as the liquid treating surface, a corrugated wall 14, which also may serve as a portion of the structural enclosure. The corrugated wall 14 corresponds to the liquid treating surface having linear depressions therein shown in FIGURES 1, 2, 3, 4, and 5. Also shown in FIGURES 6 and 7 are a feed liquid inlet 15, a feed liquid reservoir chamber 16, a liquid retaining wall 17 terminating in a skirt or extension 18 adjacent the treating surface 14, forming a liquid outlet 19 defined by said liquid retaining wall and said treating surface, a liquid evaporating space 20, a collection space for unevaporated liquid 21, an outlet for unevaporated liquid 22, and a vapor outlet 23.

The liquid evaporator illustrated in FIGURES 6 and 7 operates in a manner well known to those skilled in the art. More specifically, heated liquid enters the apparatus through the inlet 15 into a reservoir 16 and drains through the feed distribution outlet 19 into a smooth, even-flowing film on the treating surface 14. As the liquid film passes down over the treating surface in the evaporator space 20, a portion of the liquid evaporates and leaves the apparatus through the outlet 23. Unevaporated liquid eventually reaches the bottom of the treating surface and is collected in the liquid collection space 21 and is removed from the apparatus through the liquid outlet 22. Evaporation of liquid in the apparatus may be further enhanced by reducing the pressure in the evaporation space 20 or by adding heat to the space 20 in the form of a hot gas, or, alternatively, heating surface 14 by external means (not shown) in a known manner.

From the above illustrations and descriptions of the present invention, it may be seen that a liquid-carrying surface having corrugations or depressions therein is necessarily used in conjunction with the present invention. This invention is advantageous therefore not only because of the smooth, even-flowing film of liquid which is distributed at the top of the treating surface in a falling-film, liquid treating apparatus but also because it necessarily involves a treating surface of increased surface area.

While the present invention has been described with reference to particular embodiments thereof, it will be understood that numerous modifications may be made by those skilled in the art without departing from the true spirit and scope of the invention. Therefore, the appended claims are intended to cover all such equivalent variations which come within the true spirit and scope of the present invention.

What I claim as new and desire to secure by Letters Patent of the United States is:

1. A liquid feed distributor for forming a liquid film on a downwardly extending treating surface having a plurality of linear depressions therein arranged in the direction of liquid flow over said surface, said distributor comprising:
    (a) a liquid reservoir disposed entirely above said treating surface whereby the product and released vapors of the treatment are removed directly from the apparatus from the space below said reservoir;
    (b) said reservoir having a bottom wall;
    (c) said reservoir being provided with a plurality of outlets;
    (d) said bottom wall having an edge for defining a portion of each of said outlets;
    (e) said edge of said bottom wall and said treating surface being joined in an abutting relationship along a line whereby the cross-sectional configuration of said treating surface defines the remaining portion of each of said outlets; and
    (f) whereby the flow of liquid onto said treating surface is initiated along the line at which said edge of said bottom wall and said surface are joined.

2. The apparatus recited in claim 1 wherein:
    (a) said treating surface comprises a generally corrugated wall having alternating crests and troughs on either side thereof forming said linear depressions;
    (b) said edge of said bottom wall is in abutment with the crests on one side of said treating surface; and
    (c) whereby the troughs on said one side and said edge of said bottom wall define, in cooperation, a plurality of outlets for delivering the liquid from said reservoir to said treating surface.

3. The apparatus recited in claim 2 wherein:
    (a) said generally corrugated wall comprises a hollow tubular member;
    (b) said bottom wall is provided with an annular opening for receiving said tubular member;
    (c) one diameter of said opening having a corrugated configuration so as to provide a liquid tight fit with the corrugations of one side of said tubular member;
    (d) the other diameter of said opening having a generally smooth circular edge abutting the crests on the other side of said tubular member;
    (e) whereby the troughs on the other side of said tubular member form said outlets in cooperation with said edge.

4. The apparatus recited in claim 2 wherein said edge of said bottom wall includes a skirt member extending generally parallel to said corrugated wall and in abutment with the crests on one side thereof, thereby to form a plurality of parallel, elongated, initial flow-directing passages in said outlets defined by said skirt member and the alternating troughs on said one side.

5. In a falling-film liquid evaporator comprising a vertically arranged, generally rectangular container having conduit means delivering liquid to an upper reservoir chamber therein, means for removing released vapors and unevaporated liquid from the evaporator directly from a lower portion thereof below said reservoir chamber, and a downwardly extending liquid treating surface in the lower portion extending thereinto from said reservoir chamber, said surface having a plurality of linear depressions arranged in the direction of liquid flow over said surface, the improvement comprising:
    (a) a liquid feed distributor in the bottom of said reservoir chamber;
    (b) said liquid reservoir chamber being disposed entirely above said treating surface;
    (c) said reservoir having a bottom wall;
    (d) said reservoir being provided with a plurality of outlets in said bottom wall;
    (e) said bottom wall having an edge for defining a portion of each of said outlets; and
    (f) the remaining portion of each of said outlets being defined by the cross-sectional configuration of said treating surface abutting said edge of said bottom wall.

References Cited

UNITED STATES PATENTS

| 479,778 | 8/1892 | Bender | 159—13 |
|---|---|---|---|
| 2,753,932 | 7/1956 | Eckstrom et al. | 159—13 |
| 3,099,607 | 7/1963 | Lustenader et al. | 159—13 |
| 3,152,947 | 10/1964 | Monick et al. | 159—28 X |
| 3,244,601 | 4/1966 | Diedrich | 159—13 X |
| 2,827,267 | 3/1958 | Ris | 165—118 X |

FOREIGN PATENTS

| 11,352 | 1889 | Great Britain. |
|---|---|---|
| 500,294 | 2/1939 | Great Britain. |

NORMAN YUDKOFF, *Primary Examiner.*

J. SOFER, *Assistant Examiner.*